UNITED STATES PATENT OFFICE.

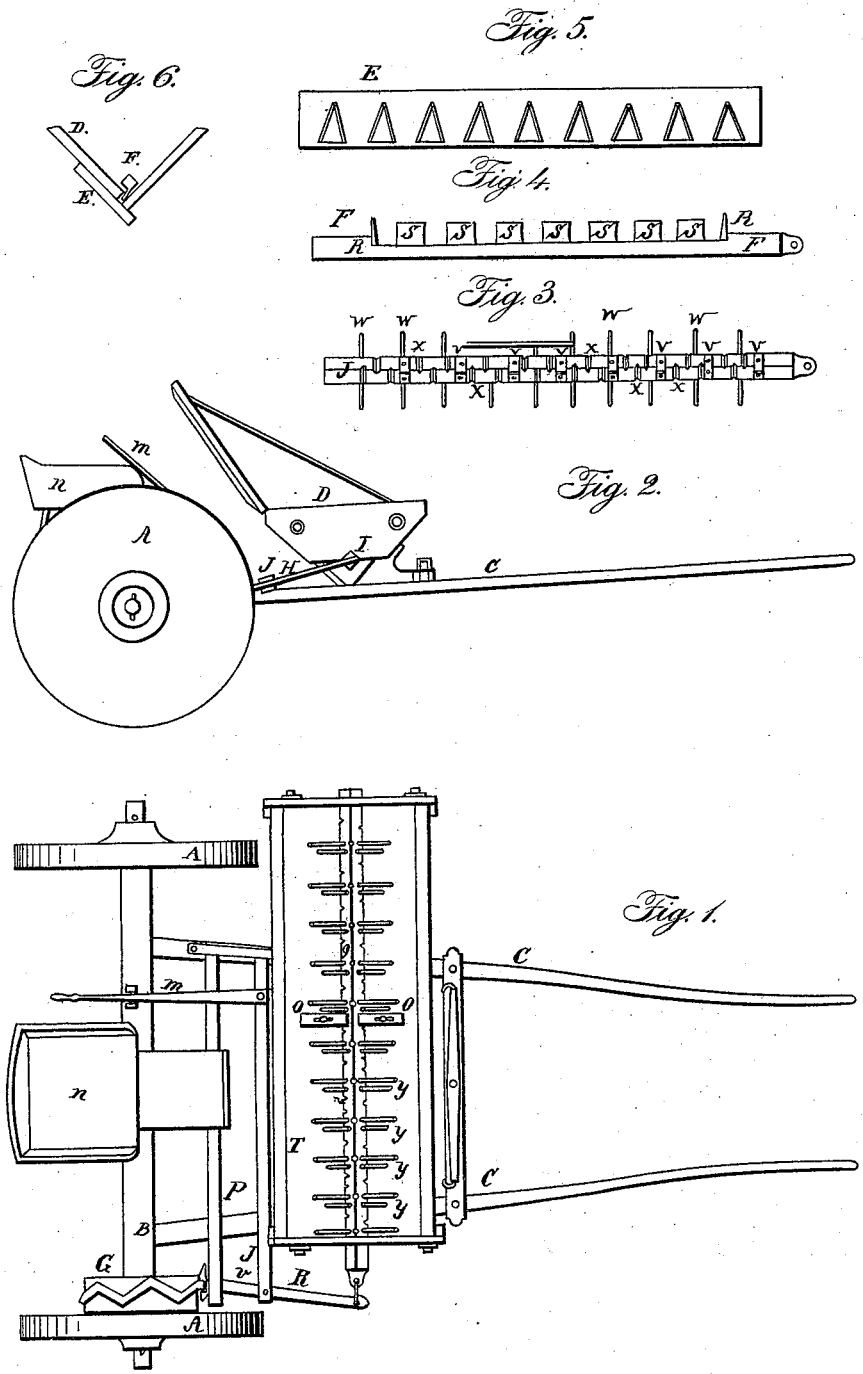

SOLON P. HUBBELL, OF UNADILLA, NEW YORK.

IMPROVEMENT IN SOWING-MACHINES.

Specification forming part of Letters Patent No. 24,391, dated June 14, 1859.

*To all whom it may concern:*

Be it known that I, SOLON P. HUBBELL, of the town of Unadilla, and county of Otsego, and State of New York, have invented a new and useful Improvement in Machines for Sowing Plaster, Lime, and Various Kinds of Grain; and I do hereby declare that the following is a full, clear, and exact description thereof, reference being had to the accompanying drawings, with letters of reference marked thereon, in which—

Figure 1 is a plan showing the general construction of a machine of my invention. Fig. 2 is an elevation of the same. Fig. 3 is a view of the under side of vibrating bar used in sowing plaster. Fig. 4 is a vibrating bar used in sowing grain. Fig. 5 is a view of the regulating-plate to be used with vibrating bar represented in Fig. 4. Fig. 6 is a cross-section of the hopper, showing the relative position of vibrating bar and regulating-plate arranged for sowing grain.

The nature of my invention consists in the arrangement of devices hereinafter described.

A A are a pair of wheels of the ordinary construction such as are used for wagons, (or may be made of plank and bound with iron,) of about three feet in diameter.

B is an axle, which is supported by said wheels.

C C are shafts, which are firmly attached to the axle B, and by which the machine is drawn, and guided by horse or other power.

D is the hopper or box containing the plaster or seed to be sown, on each side of which pins Y, slide-blocks O, and clearers V, and the whole supported by shafts C C at a point forward of the wheels sufficient to clear them. The hopper D is a triangular form, having at its lowest extremity an opening suffiicently large to allow of the greatest quantity being sown.

E is a guide-plate, which is perforated with triangular openings, and by which the quantity to be sown is regulated, which effect is produced by its covering the opening in the hopper; and by raising the plate E, so that its greatest hole covers the same in the hopper, sows the greatest quantity and by lowering the plate E, so as to bring the narrowest part of the opening in contact, produces a contrary effect.

F is a reciprocating bar used in sowing grain. Fig. 6 shows a cross-section of the bar and its position in regard to the regulating-plate E.

G is a cam-wheel, which is attached to the supporting-wheel A, and which by means of the forked lever H gives motion to the reciprocating bar I, which bar is armed with long teeth W, and also the sides of the hopper, which, as the bar reciprocates, crushes and pulverizes the lumps that are contained in the hopper. The under side of the bar I is formed with a series of angular notches, X, extending across its surface, which conduct the plaster down to the opening in the hopper. The notches are made about one-fourth of an inch in depth, and are placed at intervals of two inches. The under side of the vibrating bar is lined with iron, to prevent friction and also wear, which lining is formed of band-iron of about one inch in width and made fast to the bar at intervals of about two inches, and extends below the bar so as to pass nearly through the opening in the hopper to prevent the possibility of clogging.

J is a lever or bar supporting the forked lever H. This bar is attached to the shaft C by a pin, Z, forming a joint to admit of throwing the lever H out of gear, which is effected by the lever M, which is worked by the driver, who occupies the seat N. When desired to stop sowing, as in going to the field or from one field to another in sowing grain, the reciprocating bar, when thrown out of gear, is made to cover the openings, so as to prevent scattering the seed.

O O are slide-blocks placed on each side of the hopper D, which are adjustable, and are for the purpose of preventing the bar I from springing or raising.

P is a rod made fast to the shafts, and supports the back end of the forked lever H, also the front of driver's seat.

Having thus, I believe, fully described its construction, I now describe its operation.

In sowing plaster or lime or similar material I use the toothed bar I, with which I perform the entire operation of pulverizing and sowing. The regulating-plate E can be raised, if desirable, so as to leave the opening clear and free. In sowing grain the reciprocating bar F is used in the place of the bar I. The regulating-plate E is set to gage the desired amount to be sown. The performance is in other respects the same as in sowing plaster, &c.

Having thus, I believe, described its construction and operation, what I claim as my invention, and desire to secure by Letters Patent, is—

1. The combination of the bar J, having teeth W, angular notches X, and clearers V, with hopper D, its pins Y, and slide-blocks O, the whole being constructed and arranged as and for the purpose set forth.

2. In combination with the hopper D, pins Y, slide-blocks O, and regulating-plate E, the reciprocating bar F, with its clearers R R' and stirrers G, these several devices being constructed and arranged for operation conjointly in the manner and for the purpose described.

SOLON P. HUBBELL.

Witnesses:
ANSON JUDSON,
W. H. EMORY.